Nov. 24, 1959 W. B. PRATT 2,913,924
STEERING WHEEL
Filed Aug. 23, 1956 2 Sheets-Sheet 1
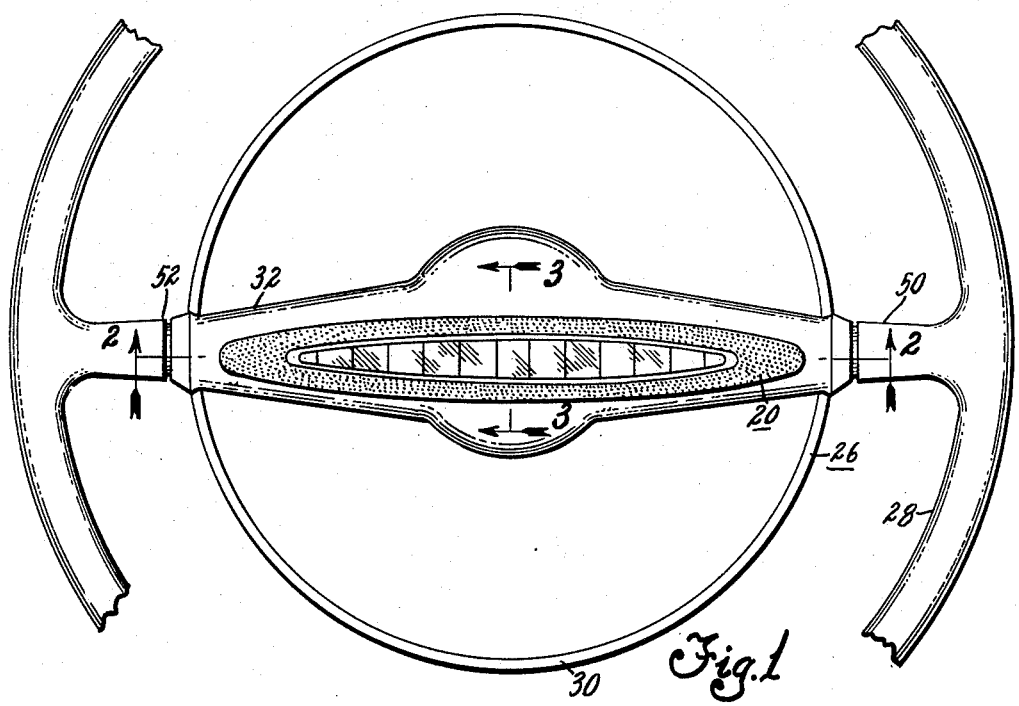
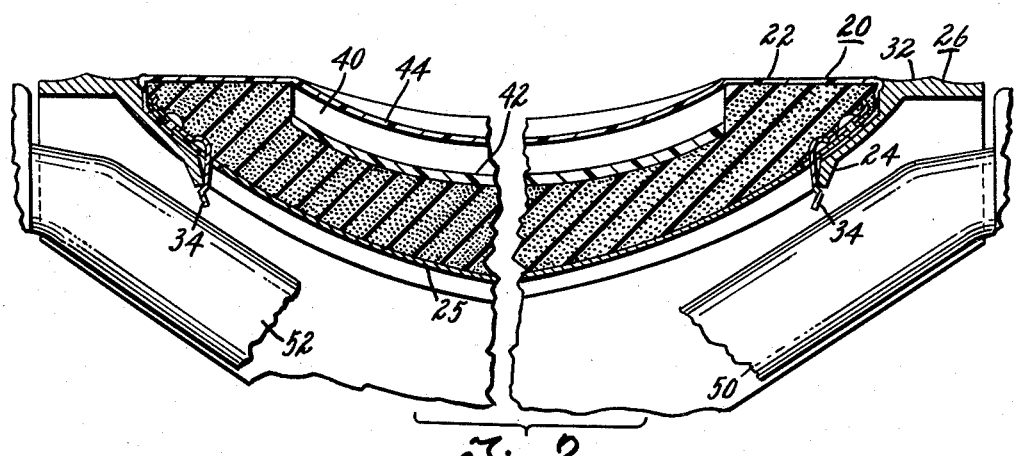
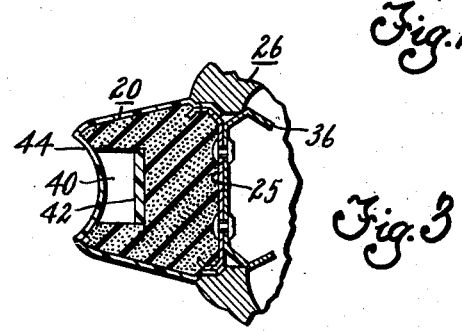
INVENTOR.
WILLIAM B. PRATT
BY
HIS ATTORNEY Nov. 24, 1959   W. B. PRATT   2,913,924
STEERING WHEEL
Filed Aug. 23, 1956   2 Sheets-Sheet 2
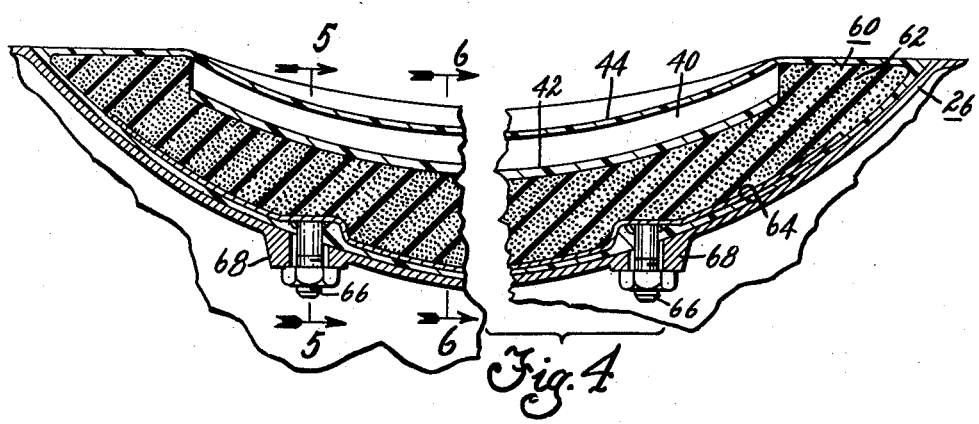
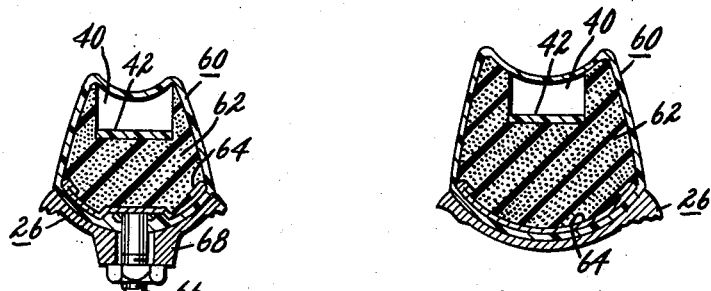
INVENTOR.
WILLIAM B. PRATT
BY
HIS ATTORNEY

United States Patent Office 2,913,924
Patented Nov. 24, 1959

2,913,924
STEERING WHEEL

William B. Pratt, Birmingham, Mich., assignor to General Motors Corporation, Detroit, Mich., a corporation of Delaware Application August 23, 1956, Serial No. 605,800

5 Claims. (Cl. 74—552)

This invention relates to steering wheels and is particularly concerned with safety steering wheels wherein a highly resilient panel or cross member is utilized to protect the driver during an accident.

It is the main object of the invention to provide a steering wheel having an insert portion of a highly resilient rubber-like material which acts as a cushion whereby, if during an accident, the driver's body is thrown against the wheel, the resilient portion will absorb the shock and thereby reduce, or prevent, injury to the driver.

In carrying out this object, it is a further object to provide a steering wheel wherein the spoke portion is recessed for receiving a sponge rubber insert.

Another object of the invention is to utilize the sponge rubber insert as a portion of the horn blowing ring which covers the spokes of the wheel.

In carrying out the above object, it is a still further object to have the sponge rubber portion easily removable wherein said portion includes spring clips which readily attach the portion to the wheel.

Further objects and advantages of the present invention will be apparent from the following description, reference being had to the accompanying drawings wherein preferred emodiments of the present invention are clearly shown.

In the drawings:

Figure 1 is a fragmentary view of a two-spoke steering wheel with a horn blowing ring including a resilient rubber cushion thereon.

Figure 2 is a section taken along line 2—2 of Figure 1.

Figure 3 is a modification of the spring clip design used in connection with the cushion, taken on line 3—3 of Fig. 1.

Figure 4 is a sectional view taken on line 2—2 of Figure 2 showing another modification in design.

Figure 5 is a view taken on line 5—5 of Figure 4 and Figure 6 is a view taken on line 6—6 of Figure 4.

The safety trends in automotive design have led to a number of innovations in design of automotive bodies and accessories. One of these is directed to steering wheels wherein sponge rubber grip portions have been provided for improving the safety factor of the steering wheel.

In many cases of bodily injury sustained in vehicular accidents, the driver is injured by being hurled against portions of the steering wheel. To overcome this, various designs have been proposed and, to this end, the present invention is specifically directed.

In the present invention, that portion of the wheel which gives the greatest resistance toward movement is padded so as to reduce the shock when the driver's body is hurled against that portion of the wheel. In this connection, the spoke portion including the hub is the most rigid part of the wheel and it is here that the padding is preferably employed. It is obvious that the rim portions of the wheel will bend and distort and, in themselves, act as shock absorbing mediums for absorbing the impact of the driver's body when thrown against the wheel. However, the hub portion and the spoke portions adjacent the hub are relatively immobile and offer great resistance and do considerable bodily harm.

The present invention utilizes an easy-to-form cushion which may be clipped, or otherwise attached, in the horn blowing ring or adjacent the upper portions of the spokes of the wheel. This cushion is formed from a highly porous material which preferably has a low rate of recovery, for example, a semi-rigid elastomeric sponge, whereby the shock is absorbed to a large degree. In this connection, sponge rubber, either latex foam or chemically blown, foamed polyisocyanates, foamed vinyls, or sponges made from any of the synthetic rubbers such as butadiene styrene copolymers, butadiene acrylonitrile copolymers, polychloroprene, etc., or compatible mixtures of the foregoing may be used. The specific methods used in foaming or blowing the material and the specific type of foam or sponge form no part of this invention since such materials and the methods of forming them are well known in the art.

Specifically, the invention is directed to a spongy shock absorbing pad 20 preferably having a film, or skin, 22 thereover, which clips over lugs 24 within a horn blowing ring 26 of a steering wheel 28. The horn blowing ring 26 includes a rim portion 30 and a cross spoke portion 32 which is covered by the pad. The pad, or cushion, 20, includes a pair of spring clips 34 attached to a sheet metal backing 25 for the pad. The clips 34 attach to lugs 24 and hold the pad in place. Another type of clip is shown at 36 in Figure 3, and either form of clip or combinations thereof may be used. It will be noted that the central portion of the pad, or cushion, 20 includes a recess 40 having colored plastic portion 42 therein and an upper pane 44 covering the cavity 40. This pane 44 is recessed below the main body of the cushion 20. Suitable indicia, or design, may be painted or embossed on the plate 42 which is visible through the pane 44. The plate 42 and the pane 44 are preferably from clear plastic material such as polystyrene, etc. While this decorative panel is shown, it is understood that the cushion 20 may be continuous without the decorative panel, the specific structure being a matter of choice. In any event, the cushion shown at 20 completely covers the spoke portions of the horn blowing ring and likewise covers the spokes 50 and 52 of the wheel which are positioned beneath the ring. In this manner, that portion of the wheel to which the operator of the vehicle is most vulnerable is padded.

A modification of the structure is shown at 60 in Figure 4 wherein resilient sponge-like material 62 is bonded to a metal plate 64 which includes a plurality of attachment screws 66 thereon. Screws 66 pass through apertured bosses 68 either in the spokes of the wheel or in the cross member of the horn blowing ring as the case may be. Here again, the decorative portion may be provided at the center of the wheel, if desired. In both instances, the spongy cushioning material covers the spokes. In the embodiments illustrated, the steering wheels include only two spokes. It is apparent that three or four spokes may likewise be provided wherein the cushioning material is formed in other shapes to completely cover the central portions of the spokes together with the hub of the wheel.

The present invention is specifically directed to a removable cushion which facilitates the manufacture of the wheel. In the past, most wheels used to improve safety conditions in the car have the spongy material molded directly thereon. This increased the cost of fabricating wheels and, likewise, if, for any reason, the spongy material should be injured or be torn, the entire wheel had to be discarded. In the present instance, only that portion of the wheel which offers great resistance toward the body is padded and the padding material or cushion is removable so that a standard wheel may be used which includes an insert of spongy material to act as a cushion. If the cushion is not desired, the insert may be made of die cast metal or plastic and may be inserted in the same position without requiring a change in design. This factor improves the salability of the wheel since, in all cases to date, the safety design is an optional feature which heretofore has required replacement of the wheel with a safety steering wheel while in the present instance, the standard steering wheel may be supplied with the safety feature whenever it is desired by the customer.

While the embodiments of the present invention as herein disclosed constitute preferred forms, it is to be understood that other forms might be adopted.

What is claimed is as follows:

1. A safety steering wheel comprising in combination, a rim portion, a hub, two spokes connecting the rim to the hub, said spokes including an open cavity associated therewith and extending longitudinally thereof and across the hub, and a resilient pad having an outer conformation similar to that of the cavity and having a height greater than the depth of the cavity, said pad being releasably held in the cavity for presenting a resilient bumper above the plane of and along the spokes and extending above and across the hub of the wheel.

2. The safety steering wheel as defined in claim 1 wherein the pad comprises a metal backing including fastening means at one side thereof for releasably holding the pad to the wheel and an elastomeric covering bonded to the other side of said backing.

3. The safety steering wheel as claimed in claim 1 wherein said pad includes a central depression therein and an indicia bearing insert contained in said central depression, said insert being disposed below the upper surface of said pad.

4. A safety steering wheel comprising in combination, a rim portion, a hub, a pair of spokes connecting the rim to the hub, said spokes including an extended depressed portion extending below the axis of the spokes at the rim connection and passing through the hub, and a one piece resilient pad adapted to fill said depressed portion and to be releasably held in said depressed portion and having a thickness sufficient to extend above the normal plane of the hub and the spokes.

5. A safety steering wheel comprising in combination, a rim portion, a hub, spokes connecting the rim to the hub, said spokes including a depressed portion centrally located intermediate the connection of the spokes with the rim, at least a portion of which is slotted completely through the spokes, and a continuous resilient pad having an outer conformation similar to that of the depression and a height greater than the height of the depression and adapted to be releasably held to the spokes by clip means engaging portions of said slot.

References Cited in the file of this patent

UNITED STATES PATENTS

| | | |
|---|---|---|
| 2,070,760 | Straith | Feb. 16, 1937 |
| 2,270,550 | Oswald | Jan. 20, 1942 |
| 2,499,993 | Gregg | Mar. 7, 1950 |
| 2,563,339 | Kellogg | Aug. 7, 1951 |
| 2,631,204 | Kibiger | Mar. 10, 1953 |
| 2,649,311 | Hetrick | Aug. 18, 1953 |
| 2,784,006 | Dye et al. | Mar. 5, 1957 |

FOREIGN PATENTS

| | | |
|---|---|---|
| 1,090,586 | France | Oct. 20, 1954 |